United States Patent [19]

Fujii et al.

[11] Patent Number: 4,500,612
[45] Date of Patent: Feb. 19, 1985

[54] TEMPERATURE CONTROL DEVICE FOR A FUEL CELL

[75] Inventors: Masao Fujii, Takarazuka; Enju Nishiyama, Kawanishi, both of Japan

[73] Assignee: Mitsubishi Denki Kabushiki Kaisha, Tokyo, Japan

[21] Appl. No.: 370,548

[22] Filed: Apr. 21, 1982

[51] Int. Cl.³ .................... H01M 8/12; H01M 10/50
[52] U.S. Cl. ...................................... 429/26; 429/120
[58] Field of Search .............. 429/20, 29, 26, 120; 165/108, 172

[56] References Cited

U.S. PATENT DOCUMENTS

| | | | |
|---|---|---|---|
| 1,938,700 | 12/1933 | Huet | 165/108 |
| 3,088,990 | 5/1963 | Rightmire et al. | 429/20 |
| 3,321,334 | 5/1967 | Palmer | 429/26 |
| 3,923,546 | 12/1975 | Katz et al. | 429/26 X |
| 4,169,917 | 10/1979 | Baker et al. | 429/26 |
| 4,192,906 | 3/1980 | Maru | 429/13 |
| 4,233,369 | 11/1980 | Breault et al. | 429/26 |
| 4,371,034 | 2/1983 | Yamada et al. | 165/108 |

OTHER PUBLICATIONS

Feldman, Thomas K., and Whiting, Glen H., "The Heat Pipe", Mechanical Engineering, Feb. 1967, pp. 30-33.

Primary Examiner—Brian E. Hearn
Assistant Examiner—Stephen J. Kalafut
Attorney, Agent, or Firm—Wenderoth, Lind & Ponack

[57] ABSTRACT

A temperature control device for a fuel cell has a heat exchanger piping sandwiched between a pair of temperature control plates in heat exchange relation therewith, said temperature control plates having reaction gas conduit means on surfaces opposite to confronting surfaces thereof. A circulation piping is adapted for circulation by a heat medium and is hermetically connected to an outside piping located outside of said temperature control plates for providing a closed piping system therewith. Said circulation piping contains sealed-in heat medium so that a portion of the inside space of the circulation piping is left for a gaseous phase of the heat medium. Heat exchanger means are provided to said outside piping to effect heat exchange with heat medium in said circulation piping.

2 Claims, 11 Drawing Figures

TEMPERATURE CONTROL DEVICE FOR A FUEL CELL

BACKGROUND OF THE INVENTION

Heretofore, a temperature control device has been used in conjunction with a stack of fuel cells. The conventional device is of the type in which heat medium is circulated during operation and which is inserted between adjacent ones of stacked fuel cells to effect heating at start-up of the fuel cells to promote the reaction and to take out heat produced during normal operation of the fuel cells.

FIG. 1 shows a structure of a typical conventional temperature control device. In FIG. 1, numerals 1 and 3 denote temperature control plates having reaction gas passage ducts 2 and 4 on surfaces opposite to the confronting surfaces. A heat exchanger piping 5 is mounted between these temperature control plates 1 and 3. The piping 5 has an inlet and outlet that are connected to a pump 6 by a connection piping 5a externally of the temperature control plates 1 and 3, pump 6 being adapted in turn to supply cold or warm water to the piping 5.

In operation, at start-up of the fuel cells, warm water is supplied by pump 6 to the heat exchanger piping 5 to promote the reaction to effect heat transfer to the temperature control plates so as to heat the stack of fuel cells above and below the temperature control plates. During normal operation of the fuel cells, the heat generated in the fuel cells must be removed for preventing fuel cell destruction due to rises in temperature. The heat generated in the fuel cells is transferred to the temperature control plates 1 and 3 from above and below, and thence to the heat exchanger piping 5 sandwiched between the plates 1 and 3. At this time, cold water is supplied to the piping 5 by the pump 6 which has been switched to a conduit different from that used for start-up of the fuel cells. Thus, evolved heat is transferred to the cold water and taken out, at the temperature control plates 1 and 3.

It is seen from the above that drive means such as pump 6 is required in the conventional temperature control device for circulation of cold or warm water. The prior-art device is therefore in need of a motive power for operation of these drive means. In addition, the operation of the prior-art device may not be completely reliable because the drive means consists of a pump or a motor having movable parts.

SUMMARY OF THE INVENTION

This invention envisages to provide a temperature control device free of the above-mentioned drawbacks of the prior art system. The temperature control device according to the present invention comprises heat exchanger piping positioned between a pair of temperature control plates in heat exchange relation therewith, the temperature control plates having a reaction gas conduit on surfaces opposite to their confronting surfaces, circulation piping adapted for circulation by heat medium, the circulation piping being hermetically connected to outside piping outside of the temperature control plates for providing a closed piping system therewith, the circulation piping containing sealed-in heat medium in the inside space thereof so that a portion of the space is left for a gaseous phase of the heat medium, and a heat exchanger provided to said the outside piping to effect heat exchange with the heat medium in the circulation piping.

BRIEF DESCRIPTION OF THE DRAWINGS

In the drawings, the same numerals denote same or equivalent parts.

DESCRIPTION OF PREFERRED EMBODIMENTS

Figure 2:
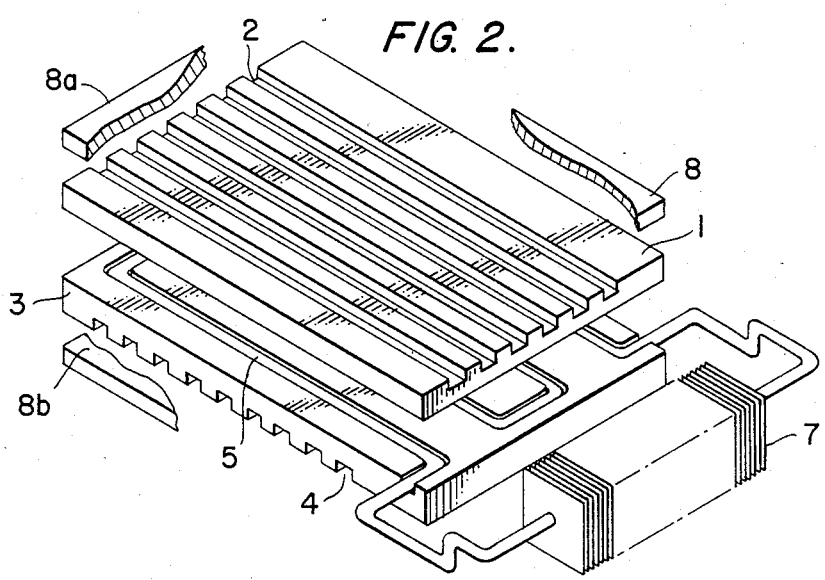
FIG. 2 is a perspective view showing the structure of a preferred embodiment of the present invention.

Referring to FIG. 2 showing a preferred embodiment of the present invention, temperature control plates 1 and 3 are placed between two adjacent fuel cells 8a and 8b of a fuel cell stack, not shown. A heat exchanger tube 5 is positioned between the plates 1 and 3 for defining a first channel and is connected to a cooling heat exchanger tube 7 for defining a confined closed-loop channel for heat medium. The cooling heat exchanger 7 defines a second channel which is subjected to a thermal condition different from that prevailing in the fuel cells 8a, 8b. A heat medium such as water or Fluon is sealed in the closed loop heat medium channel, from which air has been exhausted to provide a vacuum. In the present embodiment, the cooling heat exchanger 7 defining the second channel is positioned at a height level above that of the heat exchanger tube 5 defining the first channel.

In operation, heat generated in the stacked fuel cells 8a, 8b is transmitted to the temperature control plates 1 and 3 from above and below and thence to the heat exchanger tube 5 positioned between the plates 1 and 3. This heat vaporizes the heat medium enclosed in the heat exchanger tube, and the heat medium thus vaporized flows through the heat medium channel in a gaseous phase to impart its heat to the outside in the cooling heat exchanger 7 positioned at a higher level than the tube 5. This gaseous phase is condensed to a liquid phase and returned by its own weight to the tube 5 between the control plates 1 and 3. Thus, heat medium may be circulated without resorting to a driving power source.

In the above embodiment, electrical insulation of the cooling heat exchanger may be simplified through use of electrically insulating material for the piping connection between the heat exchangers 5 and 7.

Figure 3:
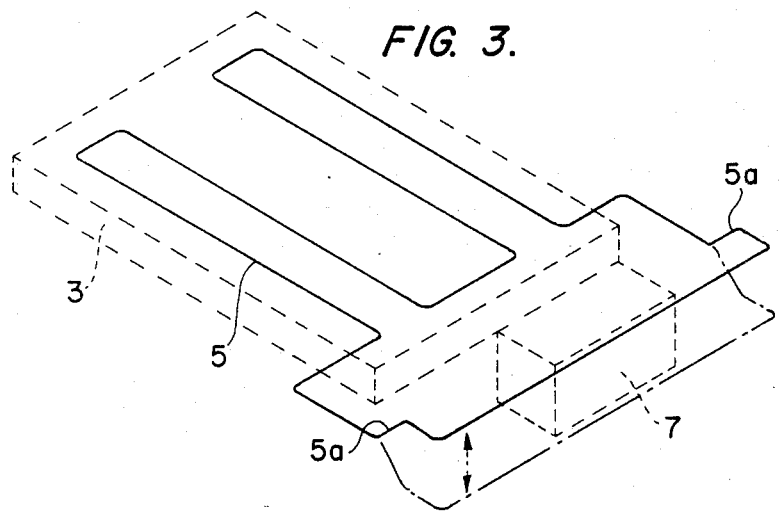
FIG. 3 is a perspective view showing a piping system in a modified embodiment.

In a modification shown in FIG. 3, a part of the heat medium channel is formed of a piping 5a of flexible material with the possibility of changing the height of the cooling heat exchanger 7. The flow rate of the heat medium circulated through the heat medium channel and hence the cooling ability may thus be changed by adjusting the height of the cooling heat exchanger. The radiator level (height of heat exchanger 7) may be lowered occasionally to below the cooling tube level to effect heating for start-up of the fuel cells by an external heat source.

Figure 1:
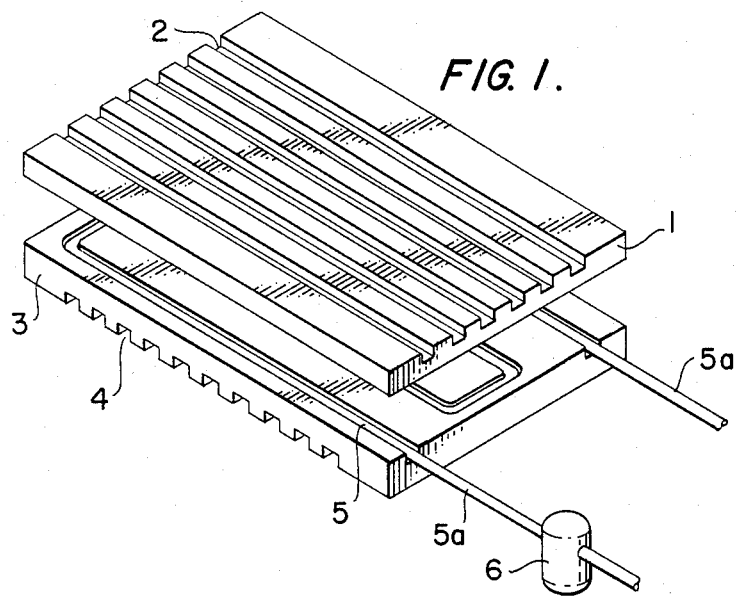
FIG. 1 is a perspective view showing the structure of a temperature control device for a customary fuel cell to which the present invention may be applied.
Figure 4:
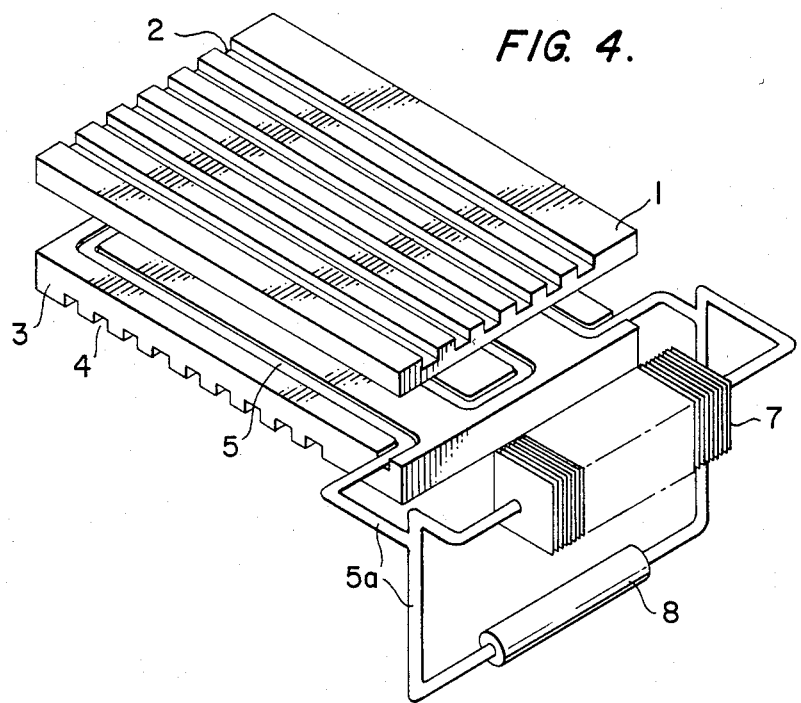
FIG. 4 is a perspective view showing the structure of a further modified embodiment.

Referring to FIG. 4 showing a further modification, numerals 1 and 3 denote temperature control plates similar to those shown in FIG. 1. A heat exchanger tube 5 is positioned between the plates 1 and 3. Numeral 7 denotes a cooling heat exchanger positioned at a higher level than that of the heat exchanger tube 5. Numeral 8 denotes a heating heat exchanger which is positioned at a lower level than the heat exchanger tube 5. The tube 5 and the heat exchangers 7 and 8 are hermetically connected to one another by connection piping 5a for providing a closed piping system. Air is exhausted to produce a vacuum in the inside space of the closed piping system, the closed piping system being filled with heat medium such as water or Fluon such that a portion of the inside space is left for a gaseous phase.

In operation, during cooling of the fuel cells, the heat produced in respective stacked fuel cells is transmitted to plates 1 and 3 from above and below, depending on the prevailing heat gradient, and thence to the heat exchanger tube 5. This heat vaporizes the medium enclosed in the tube 5, while the control plates 1 and 3 are robbed of the latent heat of vaporization and cooled. The vapor produced at this time in the heat exchanger tube 5 rises through connection piping 5a to enter the heat exchanger or radiator 7 to be cooled by outside air to condense into a liquid which is then lowered by gravity and returned into the heat exchanger tube 8. Heat radiation from the enclosed medium occurs at the heat exchanger 8 as well. Heat radiators known per se for cooling of fluid material and having a fin mounted about a piping made of good heat conducting material, may be used in a well-known manner as the cooling heat exchanger 7.

The method of heating respective stacked fuel cells during fuel cell start-up will now be described in detail. The heat exchanger for heating 8 has means for heating the heat medium 8 flowing therethrough. Said heating means has a heater wire coiled around a pipe for the heat medium extending through the inside of the heat exchanger 8, or a blower adapted to direct warm air to said pipe. The heat medium thus heated in the heat exchanger 8 is lowered in density and rises through connection piping 5a due to buoyancy caused by the difference in density between the heated medium and the medium contained in the heat exchanger tube 5. The heat medium entering the tube 5 through piping 5a imparts its heat to the temperature control plates 1 and 3 and acts to heat the fuel cells. The heat medium 8 itself is cooled in such process to be then returned by its own weight into the heat exchanger 8 due to increase in density caused by such cooling. Heat medium may thus be circulated through the piping for efficient cooling and heating of the fuel cells and without resorting to a drive source.

Figure 5:
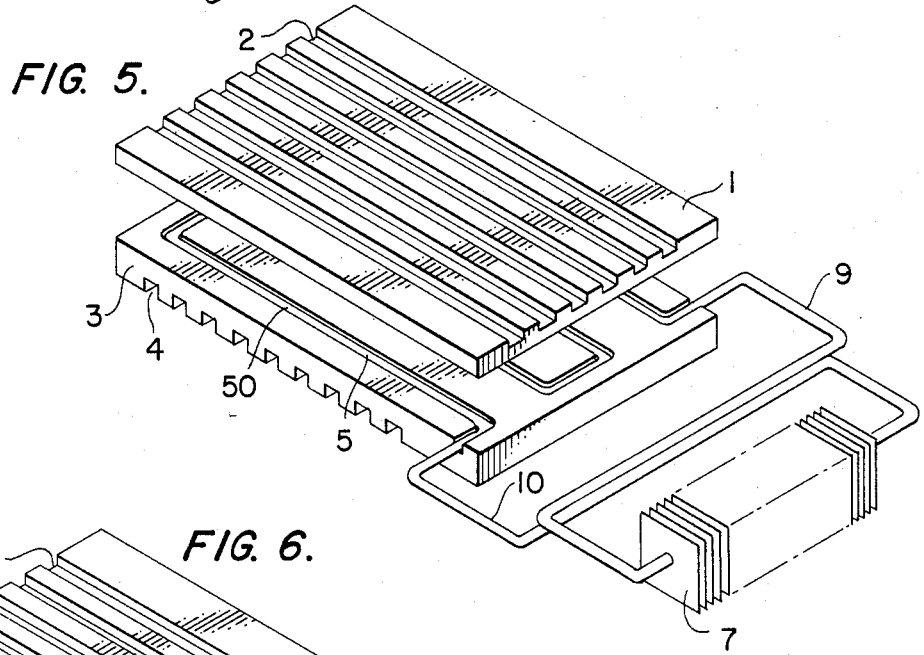
FIG. 5 is a perspective view showing the structure of a further modification in which two piping sections are contacted to effect heat exchange therebetween.

FIG. 5 shows a further modification of the invention wherein a vapor tube 9 and a liquid return tube 10 contact with each other for heat exchange on their respective outer wall surfaces. The heat medium is condensed to a liquid in the heat exchanger 7, and the liquid thus cooled receives heat from the vapor tube 9 and may thus be heated in the course of passage through liquid return tube 10 into the first heat exchanger 50. The heat medium flowing into and out of the first heat exchanger 50 may therefore exhibit a smaller temperature differential, resulting in more equalized temperature distribution on the temperature control plates.

It is to be noted that, by positioning the vapor tube 9 at a higher level than the liquid return tube 10 in FIG. 5, heat transfer is smoothed by spontaneous circulation through phase changes of the heat medium. Thus the difference in density between the vapor and liquid and the gravity flow may be turned to good account to effect a smooth transfer from the vapor tube 9 into the liquid return tube 10.

Figure 6:
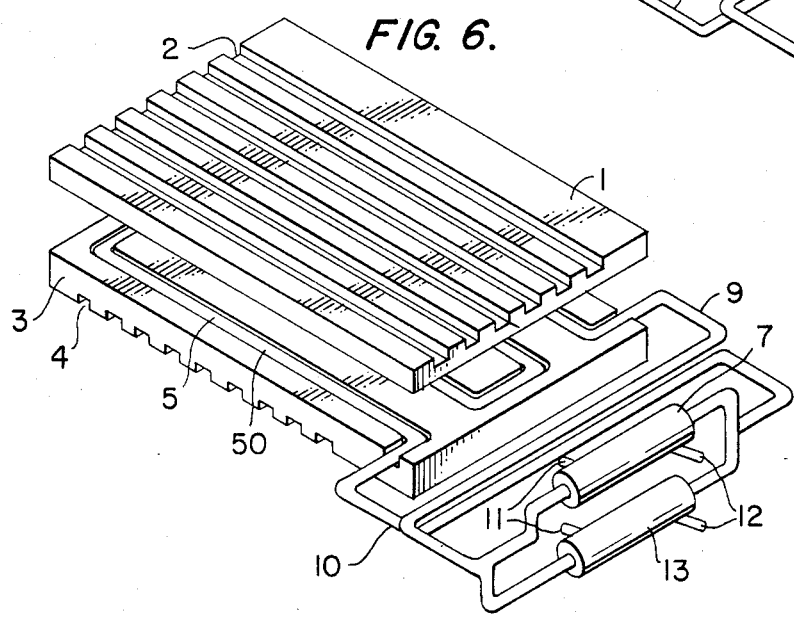
FIG. 6 is a perspective view showing a further modification pertaining to the type of modification of FIG. 5.

FIG. 6 shows a further modification wherein water is used as cooling medium in the second heat exchanger 7. Numerals 11 and 12 respectively denote water outlets and inlets of the second heat exchanger 7 which is of the dual tube type. The third heat exchanger 13 is positioned at a lower height level than the first heat exchanger 50 and in parallel with the second heat exchanger 7. The third heat exchanger 13 is of the dual tube type and used for heating the temperature control plates. The cooling medium is sealed in such amount as to fill the third heat exchanger 13, vapor tube 9, liquid return tube 10 and the first heat exchanger 50. The third heat exchanger 13 is heated by warm water introduced at 12. It is to be noted that warm air or electrical heating may be used instead of warm water. The cooling heat medium is heated in the first heat exchanger 50 and circulated spontaneously through the system as it undergoes heat exchange between the vapor tube 9 and the liquid return tube 10, as already described in connection with FIG. 5.

The heat medium is heated in the third exchanger 13 to rise through buoyancy due to changes in density. The heat medium then travels through vapor tube 9 and arrives at the first heat exchanger 50, imparting its heat to the temperature control plates. The heat medium thus cooled is recycled to the third heat exchanger 13 through liquid return tube 10. It is to be noted that, in the absence of the cooling medium in the vapor tube 9, the vapor generated in the third heat exchanger 13 flows through vapor tube 9 into first heat exchanger 50 where it is condensed to a liquid. At this time, no cooling water is supplied to the second heat exchanger 7.

Figure 7:
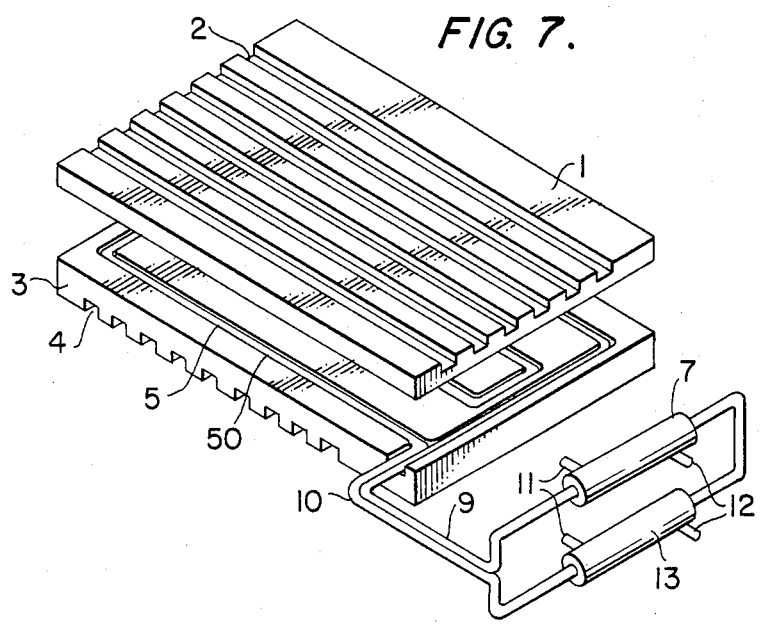
FIG. 7 is a perspective view showing a still further modification pertaining to the type of modification of FIG. 5.
Figure 8:
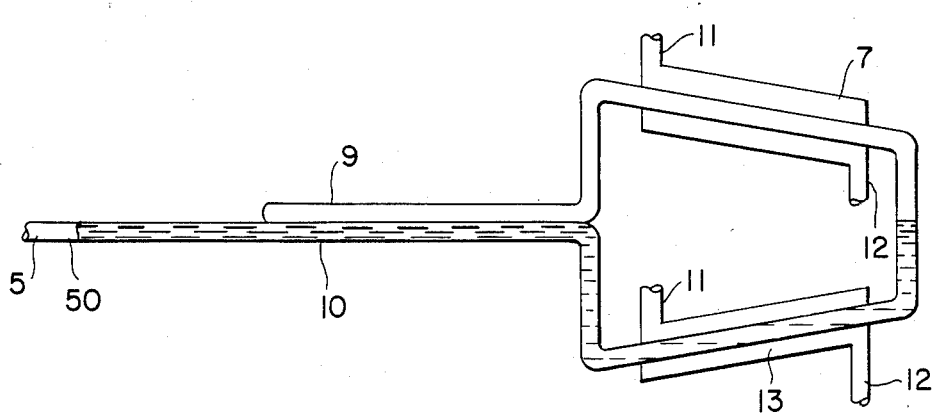
FIG. 8 is a plan view of piping used in the modification of FIG. 7.

FIG. 7 shows a further modification of the invention wherein second and third heat exchangers are connected in parallel to each other the first heat exchanger 50, the third heat exchanger 13 and the liquid return tube 10 are filled with cooling medium in liquid form as indicated in FIG. 8. The second heat exchanger 7 and the vapor tube 9 are filled with the vapor phase of the cooling medium. In the process of cooling of the temperature control plates, the operation of the present embodiment is the same as that described in connection with FIG. 5.

In the process of heating of the temperature control plates, the vapor evolved by heating of the heat medium in the third heat exchanger 13 flows through second heat exchanger 7 and vapor tube 9 into first heat exchanger 50 where it is condensed to a liquid state. Vapor flow may be smoothed by the inclined mounting of the third heat exchanger 13 as indicated in FIG. 8.

Further, condensate flow may be smoothed by the inclined mounting of the second heat exchanger 7.

Figure 9:
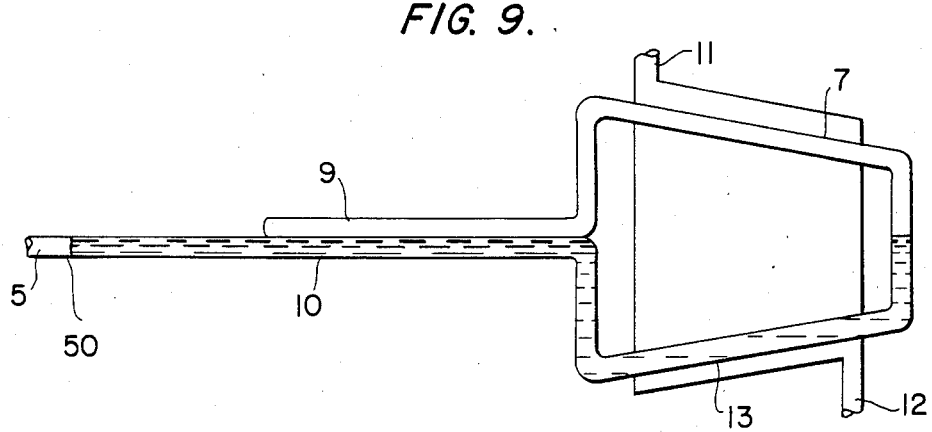
FIG. 9 is a plan view of a piping used in a modification of the type of FIG. 7.

FIG. 9 shows a further modification wherein outlets 11 and inlets 12 for cooling water and warm water are combined into one unit. The present embodiment is advantageous in that the temperature control plates may be cooled or heated as desired through changeover between cooling water and warm water.

It is to be noted that cool air and hot air may be used instead of cool water and warm water and that, although the foregoing description has been made of the case wherein the first heat exchanger is mounted to the temperature control plates, the present invention is not limited to such structure, it being only necessary that the first heat exchanger be thermally coupled to the fuel cells. It is further to be noted that, although the foregoing description has been made of a vertical stack of fuel cells, the present invention is not limited to such specific arrangement.

Figure 10:
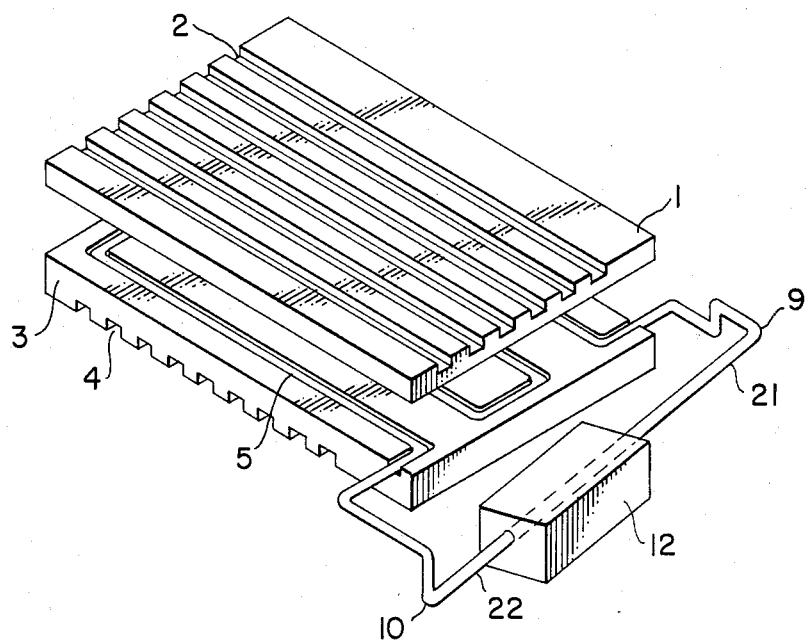
FIG. 10 is a perspective view showing the structure of a further modified embodiment of the present invention.
Figure 11:
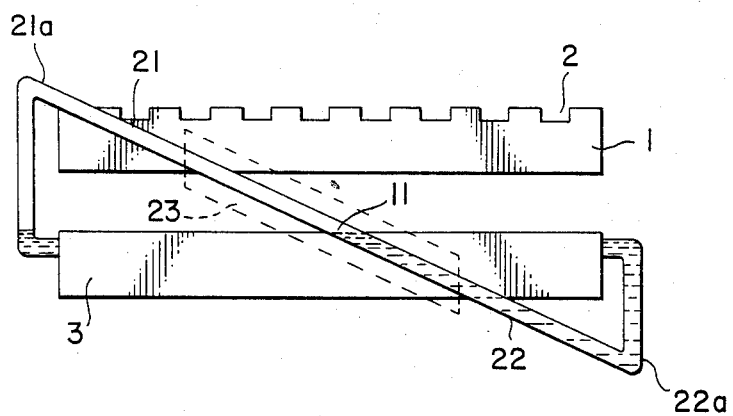
FIG. 11 is a side elevation of FIG. 10.

FIG. 10 shows a further embodiment of the present invention wherein one of the temperature control plates has been raised for illustrating the heat exchanger piping. FIG. 11 is a side elevation of FIG. 10 wherein the piping and the state of heat medium in the piping are shown with the heat exchanger being omitted.

In FIG. 10, numerals 1 and 3 denote temperature control plates, and a heat exchanger piping 5 is sandwiched between the plates 1 and 3. Numeral 21 denotes an upper piping portion mounted externally of the temperature control plates 1 and 3 and at a higher level than the heat exchanger piping 5. Numeral 22 denotes a lower piping portion mounted externally of the temperature control plates 1 and 3 and at a lower level than the heat exchanger piping 5. The heat exchanger piping 5 and the upper and lower piping portions are connected hermetically to one another for providing a closed piping system. The upper piping portion 21 is inclined from an uppermost extremity 21a thereof to a lowermost extremity 22a of the lower piping portion 22. Heat medium such as water or Fluon fills the inside of the piping from which air has been exhausted in advance. The liquid level 31 of the heat medium is preferably at an intermediate level or at the level of the heat exchanger piping 5 so that liquid and gaseous phases of the medium co-exist in the piping 5. While the liquid phase of the heat medium may reach a higher level than the level of the heat exchanger piping 5, complete filling of the inside of the piping 5 with the gaseous phase of the heat medium should be avoided. Numeral 23 denotes a heat exchanger mounted for bridging the upper piping portion 21 and the lower piping portion 22. When the heat exchanger 23 is used as a heat radiator, cold air is supplied thereto for robbing the upper and lower piping portions and mainly the upper piping portion of heat. When the heat exchanger 23 is used for heating, warm air is supplied thereto for imparting heat mainly to the lower piping portion.

The operation of the temperature control device thus constructed is described below by following the heat transfer sequence heat. When the fuel cells, not shown, are in operation and in need of cooling, the heat generated in each one of the stacked fuel cells is transferred to the temperature control plates 1 and 3 from above and below in accordance with the prevailing temperature gradient, and thence to the heat exchanger piping 5. Such heat acts to vaporize the medium enclosed in the heat exchanger piping 5, while the control plates are cooled because of emanation therefrom of the heat of vaporization. The vapor yielded in the heat exchanger piping 5 rises to the upper piping portion 21 and condenses to a liquid by being cooled at heat exchanger 23 then operating a heat radiator. The resulting liquid descends by gravity to the lower position piping 22 to be returned back into the heat exchanger piping 5. At this time, heat radiation occurs from the heat medium enclosed in the lower piping portion 22.

Next, the method for heating the respective stacked fuel cells at the start of fuel cell operation for smoothing the chemical reaction is described in detail. At this time, the heat exchanger 23 operates for heating. The heat medium in the piping portions 21 and 22 and especially in the lower piping portion 22 is heated and turned into a vapor which then rises and arrives at the upper piping portion 21. The liquid is further heated in the upper piping portion 21 and flows into heat exchanger piping 5 where it imparts heat to temperature control plates 1 and 3 to heat the fuel cells. The vapor is cooled in the process and increased in density so that it may be returned by its own weight into the lower piping portion. The heat medium may thus be circulated through the piping for efficient cooling and heating of the fuel cell without resorting to motive power.

In the illustrated embodiment, the height of the inclined piping is decreased constantly from the upper extremity of the upper piping portion 21 to the lower extremity of the lower piping portion 22. The upper and lower piping portions may however be arranged as a continuous coil which may be inclined from the upper piping portion 21 to the lower piping portion 22. In addition, separate heat exchangers may be provided to the upper and lower piping portions so as to be used as a heat radiator for the upper piping portion 21 and as a heater for the lower piping portion.

As described above, the temperature control device for a fuel cell according to the present invention is advantageous in that pumps or other operating motive power devices for forced circulation of the heat medium may be dispensed with.

What is claimed is:

1. A temperature control device for a fuel cell, comprising:
 a pair of confronting temperature control plates having reaction gas conduit means on surfaces opposite to the confronting surfaces thereof;
 circulation piping adapted for circulation therein of sealed-in liquid heat medium in the inside space thereof, with a portion of said space being left for a gaseous phase of the heat medium, said circulation piping including heat exchanger piping positioned between said temperature control plates, and including outside piping located externally of said temperature control plates hermetically connected to said heat exchanger piping to form a closed piping system therewith; and
 heat exchanger means, provided in said outside piping, for effecting heat exchange with the heat medium in said circulation pipe; said outside piping including shiftable connection piping interposed between said heat exchanger piping and said heat exchanger means for vertically shifting said heat exchanger means with respect to said heat exchanger piping.

2. The device as claimed in claim 1 wherein said shiftable connection piping is flexible.

* * * * *